United States Patent [19]

McClary

[11] Patent Number: 5,719,764
[45] Date of Patent: Feb. 17, 1998

[54] FAULT TOLERANT INERTIAL REFERENCE SYSTEM

[75] Inventor: Charles R. McClary, Spring Lake Park, Minn.

[73] Assignee: Honeywell Inc., Minneapolis, Minn.

[21] Appl. No.: 504,106

[22] Filed: Jul. 19, 1995

[51] Int. Cl.$^6$ ............................................. G05B 9/02
[52] U.S. Cl. ........................ 364/184; 364/183; 364/190;
364/943.9; 364/944.8; 364/945.4; 364/945.8;
364/946.1
[58] Field of Search ................................. 364/184, 183,
364/190, 459, 943.9, 944.8, 945.4, 945.8,
946.1; 342/352

[56] References Cited

U.S. PATENT DOCUMENTS

| | | | |
|---|---|---|---|
| 4,499,569 | 2/1985 | Lopez De Roma | 369/45 |
| 4,912,475 | 3/1990 | Counselman, III | 342/352 |
| 5,184,304 | 2/1993 | Huddle | 364/453 |

Primary Examiner—Reba I. Elmore
Assistant Examiner—Marc McDieunel
Attorney, Agent, or Firm—Charles J. Ungemach; Robert A. Pajak

[57] ABSTRACT

A fault tolerant inertial reference system employs two independent inertial reference units each having its own inertial sensor array with redundant output information. Each inertial reference unit includes an independent source of position and velocity information through employment of a satellite positioning system. In turn, a high-speed error estimator processes inertial sensor output data from a local inertial sensor array with inertial sensor output data from another external inertial sensor array for determining high-level errors, and a low-speed error estimator processes output data from the local inertial sensor array with the velocity and position information separately obtained from the satellite positioning system for determining low-level errors. In turn these high and low-level errors are processed to determine a fault-free inertial sensor configuration for subsequently determining reliable fault tolerant inertial reference data obtainable with a minimum set of inertial sensors.

10 Claims, 1 Drawing Sheet

FAULT TOLERANT INERTIAL REFERENCE SYSTEM

BACKGROUND OF THE INVENTION

1. Field of the Invention

The present invention relates generally to fault tolerant inertial reference systems, and more particularly to those fault tolerant inertial reference systems employing a plurality of redundant and independent inertial reference units, each having an array of inertial sensors also including redundancy.

2. Description of the Related Art

Use of redundant strapped down inertial reference systems in both commercial aviation and space applications is well-known in the art. Redundancy concepts are intended to achieve significant improvement in reliability and thereby enhance flight mission readiness and success. Generally, a redundant strapped-down inertial reference system may be classified into two types. The first type employs at least two inertial reference units, but commonly three. Each inertial reference unit generally includes an inertial sensor apparatus for producing sufficient inertial sensor output data which is processed for generating the usual inertial reference data, i.e., angular rotation, linear acceleration, position, and velocity information. Each inertial sensor apparatus generally includes three discrete gyros and three discrete accelerometers for providing the necessary inertial sensor output data required for producing inertial reference data and navigation information. The second type employs an inertial reference unit having an inertial sensor apparatus having more inertial sensors than required for providing inertial information, generally four like-kind inertial sensors. Commonly, the inertial sensor apparatus for the second type includes six gyros where each gyro input axis is skewed relative to the input axis of each of the other gyros, and six accelerometers where each accelerometer input axis is skewed relative to the input axis of each of the other accelerometers.

In the first type of redundant inertial reference system, as is well understood, all three gyros and all three accelerometers and their respective electronics must be operative as an inertial reference unit, as described, to produce complete inertial reference data. As is well understood, any one inertial sensor of the combination of three gyros and three accelerometers of this type of inertial sensor apparatus results in the failure of the inertial reference unit—i.e., the inertial reference data derived therefrom is no longer valid.

An example of the second type of redundant inertial reference system was proposed and described in a paper entitled, "A Redundant Strap Down Inertial Reference Unit (SIRU)", by Gerald P. Gilmore, et al., Journal of Space Craft and Rockets, Volume 9, No. 1, January 1972, pages 39–47. In Gilmore, the inertial sensor apparatus is comprised of six gyros, each having their input axis skewed relative to each other in accordance with a specific relationship, and six accelerometers, each having their input axis skewed relative to each other in accordance with a specific relationship. This six gyro/six accelerometer inertial reference unit provides a fail operative to two inertial sensor failures and fail-safe to the third inertial sensor failure operative system.

Inertial sensor failures, either accelerometers or gyros, of the skew redundant inertial reference unit may be classified into two classes, namely high-level failures and low-level failures. In general, high-level failures must be detected and isolated quickly to a low precision, and low-level failures must be detected with a greater precision requirement, but need not be isolated quickly.

For a given level of redundant inertial sensor output signals, redundant inertial reference systems of the prior art do not allow the use of the obtainable minimum number of inertial sensors. This is so, since in the multiple inertial sensor apparatus system, when one inertial sensor in the triad fails, the use of all inertial sensors in the triad are lost. On the other hand, employment of the skewed axis inertial sensor system as described above requires a minimum of four like sensors operating properly to detect failure, but has no capability to isolate inertial sensor failures. This is so, since four operative inertial sensors do not provide sufficient information to isolate the failure to the individual inertial sensor.

SUMMARY OF THE INVENTION

It is an object of the present invention to provide a minimally configured, fault tolerant, redundant inertial reference system.

It is an object of the present invention to provide a maximum level of fault tolerance with a minimum set of redundant inertial sensors of an array of inertial sensor systems which forms, in part, one of at least a pair of inertial reference systems.

It is an object of the present invention to provide a method of isolating failures in a redundant inertial sensor array thereby allowing reconfiguration to a minimum set of three inertial sensors.

In the present invention, a fault tolerant inertial reference system is comprised of two separate inertial reference units each having an array of inertial sensors providing an array of inertial sensor outputs in excess of that required for determining inertial reference information. Each of the inertial reference systems employs a high-speed error estimator and a low-speed error estimator, a means for detecting inertial sensor faults, and a means for isolating inertial sensor faults based upon results of the high-speed and low-speed error estimators. The high-speed error estimator is generally responsive to the array of inertial sensor outputs from each of the pair of inertial reference units for estimating the spatial relation between the two inertial sensor arrays and estimating a high-speed inertial sensor error estimate of each of the inertial sensors of the local inertial sensor array in relation to the performance of the other inertial sensor array. The low-speed error estimator is operative to estimate the low-speed resultant inertial data errors, more specifically any differences between the position, velocity, and like information determined by use of the local inertial sensor array with respect to an independent source of the same information derived from satellite positioning system positional information. In turn, a fault isolation and reconfiguration means provides fault isolation, and provides as an output "fault-free" inertial sensor configuration data. The fault-free configuration information is utilized by the high-speed error estimator and the low-speed error estimator for appropriately utilizing only non-faulty inertial sensors in both the low-speed and high-speed error estimators. Further, fault-free inertial sensor configuration information is also provided as in input to an inertial reference processor for only permitting the inertial reference processor to derive inertial reference information based upon only those inertial sensor array outputs of those inertial sensors which are not faulty.

DESCRIPTION OF THE PREFERRED EMBODIMENT

Figure 1:
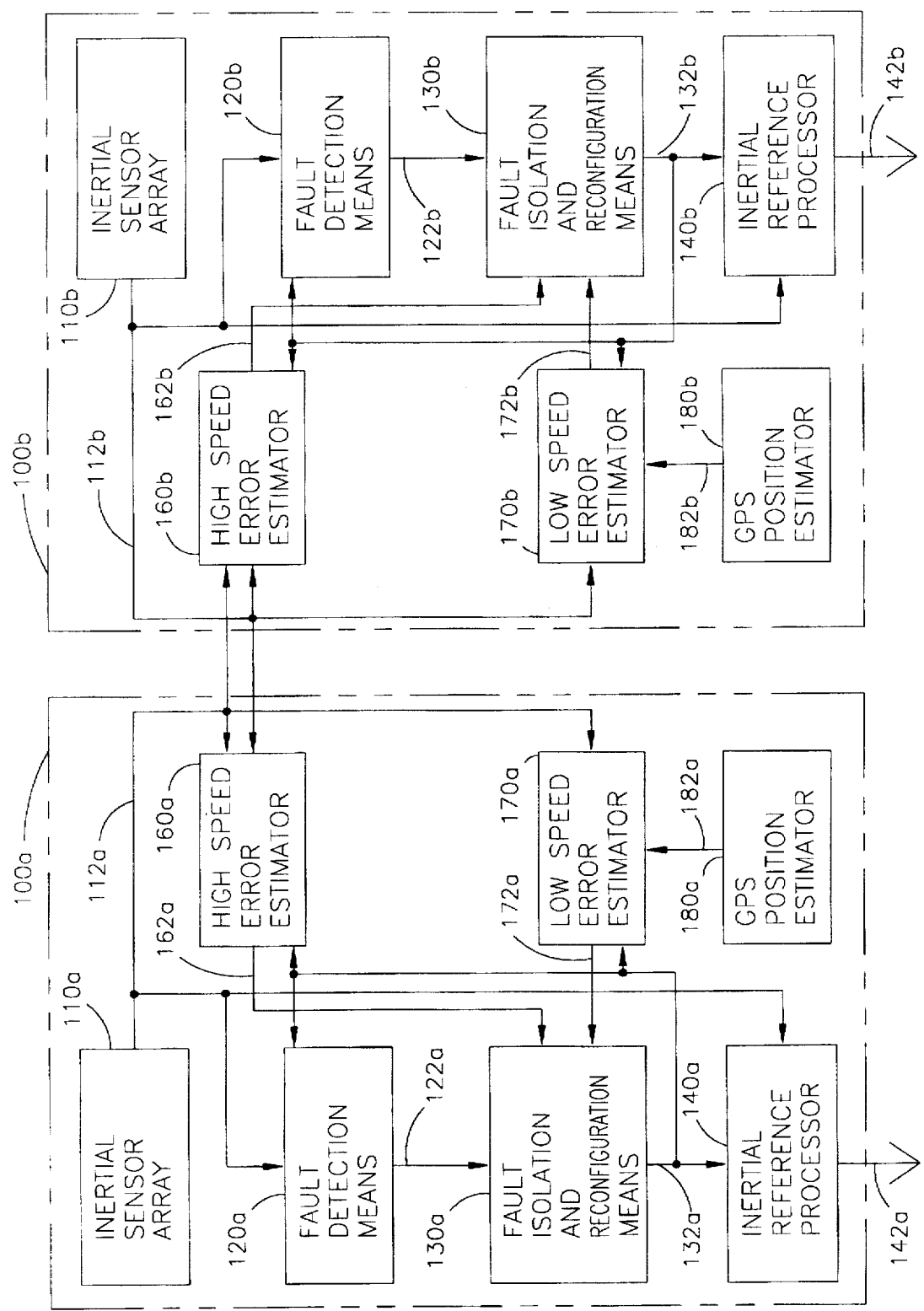
FIG. 1 is a block diagram of a minimally configured, fault tolerant, skewed redundant inertial reference system in accordance with the present invention.

FIG. 1 is a block diagram illustrating a minimally configured, fault tolerant, inertial reference system in accordance with the present invention. Thereshown are essentially identical first and second inertial reference units 100a and 100b having identical numerically identified block components distinguished by the suffix "a" or "b", respectively. Inertial reference unit 100a includes inertial sensor array 110a, fault detection means 120a, fault isolation and reconfiguration means 130a, inertial reference processor 140a, high-speed error estimator 160a, low-speed error estimator 170a, and GPS position estimator 180a.

Inertial reference unit 100a includes an array of inertial sensors mounted to a support frame, and identified as inertial sensor array block 110a. For example, inertial sensor array 110a may be a skewed axis inertial sensor system as already described. Inertial sensor array 110a provides an array of inertial sensor outputs on output signal line 112a. That is, signal line 112a represents the data associated with the observed measurements of each of the discrete inertial sensors of inertial sensor array 110a, for example, six skewed axis accelerometers and six skewed axis gyros of the type described earlier. Output signal line 112a is presented as an input to fault detection means 120a, inertial reference processor 140a, high-speed error estimator 160a, and low-speed error estimator 170a.

Fault detection means 120a is operative for monitoring the individual array of inertial sensor outputs on signal line 112a and providing an indication of the presence of a inertial sensor fault on output signal line 122a, presented as an input to fault isolation reconfiguration means 130a. Fault detection means 120a also includes, as another input thereto, fault-free inertial sensor configuration information on output signal line 132a from fault isolation and reconfiguration means 130a.

Fault detection means 120a may be provided by a variety of techniques including, but not limited to that referred to as a "GLRT" (Greater Likelihood Ratio Test) function block well known in the art. The GLRT serves to compare resultant raw inertial sensor output data and determines any inconsistencies, and issues a "flag" or indication that some fault exists—i.e., a failed inertial sensor. In turn this indication of a fault is presented to fault isolation and reconfiguration means 130a via signal line 122a.

Fault isolation and reconfiguration means 130a is generally operative for monitoring the high-speed error estimator output data on signal line 162a from high-speed error estimator 160a, and the low-speed error estimator output data on signal line 172a from low-speed error estimator 170a. Fault isolation and reconfiguration means 130a may be provided by fault isolation logic which essentially compares the high-speed and low-speed error estimates with preselected allowable maximum parameter values for each of the inertial sensors. In turn, upon exceeding such maximum parameter values, a inertial sensor fault is indicated and isolated, i.e. the faulty inertial sensor identified. Fault isolation and reconfiguration means then provides "fault-free" inertial sensor configuration data on output signal line 132a, identifying those faulty and non faulty inertial sensors.

High-speed error estimator 160a receives as inputs the array of inertial sensor outputs from the "local" inertial sensor array 110a on signal line 112a, and also the array of inertial sensor outputs from the "external" inertial sensor array 110b on signal line 112b (also mounted to the same support frame), and the local fault-free inertial sensor configuration information on signal line 132a. High-speed error estimator 160a provides as an output a high-speed error estimate on output signal line 162a which in turn is presented as an input to fault isolation and reconfiguration means 130a.

In the present invention, high-speed error estimator 160a is intended to derive those high level inertial sensor errors very quickly, but with less accuracy than those required with respect to low level errors as indicated earlier. High-speed inertial sensor errors may also be referred to as wide bandwidth inertial sensor errors. One example of high-speed error estimator 160a is a high-speed or wide bandwidth Kalman filter which is operative for concurrently estimating the spatial relationship between inertial sensor array 110a and inertial sensor array 110b, and estimating the local high-speed inertial sensor error estimates which are provided as an input to fault isolation and reconfiguration means 130a via output signal line 162a. The high-speed error estimates may take the form of data associated with each of the inertial sensors of the inertial sensor array and may include, among others, data indicative of sensor bias, scale factor, misalignment, etc.

Low-speed error estimator 170a receives as inputs the "local" array of inertial sensor outputs on output signal line 112a from inertial sensor array 110a, positional information of the support frame, like position and velocity data, provided by the local GPS position estimator 180a on output signal line 182a, and also receives as an input the fault-free inertial sensor configuration data on output signal line 132a from fault isolation and reconfiguration means 130a. Like the high-speed error estimator 160, the low-speed error estimator also provides error parameters associated with each inertial sensor of local inertial sensor array, and may also take the form of those parameters indicated above, i.e., sensor bias, scale factor and misalignment, etc., or more simply positional error parameters.

In the present invention, low-speed error estimator 170a may derive those low level inertial sensor errors less quickly than high-speed estimator 160a, but with much greater accuracy than those obtained by high-speed error estimator 160a. Low-speed inertial sensor errors may also be referred to as narrow bandwidth inertial sensor errors. One example of low-speed error estimator 170a is a lower-speed or narrow bandwidth Kalman filter which is operative for providing an indication of the differences between (i) positional information, e.g., position and velocity information, obtained by the inertial sensor outputs from the local inertial sensor array 110a, and (ii) the independent positional information provided by GPS position estimator 180a.

GPS position estimator 180a may be provided by a wide array of satellite positioning system receivers for providing positional information of the support frame, the same support frame which inertial sensor array 110a is mounted thereto. The positional information may be in the form of position and velocity data, and other like information which may be useful in providing the intended low-speed, but highly accurate, error estimates.

Inertial reference processor 140a receives as an input the array of inertial sensor outputs on signal line 112a, and also the fault-free inertial sensor configuration information on signal line 132a for providing inertial reference output information indicated by numeral 142a. Inertial reference processor 140a is intended to provide inertial reference data based on only non-fault inertial sensors as indicated by the "fault-free" configuration information.

Inertial reference unit 100b is substantially identical to reference unit 100a except for what is referred to above as the "local" data. More specifically, high-speed error estimator 160b is responsive to local inertial sensor output data on signal line 112b from inertial sensor array 110b and the data on signal line 112a from the external inertial reference unit 100a, namely from inertial sensor array 110a. Inertial sensor array 110b is intended to be mounted on the same support frame as inertial sensor array 110a. Further, low-speed error estimator 170b is responsive to the local inertial sensor data on signal line 112b, and positional information provided by the local GPS position estimator 180b on signal line 182b. The remaining interconnections and block functions of inertial reference unit 100b being the same as that already described with reference to inertial reference unit 100a.

As indicated earlier, inertial reference processor 140a receives as an input the array of inertial sensor outputs on signal line 112a, and also the fault-free inertial sensor configuration information on signal line 132a. Inertial reference processor 140a serves to provide inertial reference output information indicated by numeral 142a utilizing only that inertial sensor data indicated as being fault-free based on the fault-free configuration information on signal line 132a. Inertial reference processor 140b behaves in a similar manner to provide inertial reference output information on signal line 142b.

In redundant inertial reference systems of the types as already described, inertial sensor failures may be categorized into two classes or levels, namely, high-level failures and low-level failures. In general, high-level failures are intended to be detected and isolated quickly, but with a low precision. In contrast, low-failures may be isolated more slowly but require a high-level of precision. This may be described by the difference in performance requirements between flight control and navigation. Flight control of an aircraft requires faster detection of a fault as opposed to precision, whereas navigation requires high precision but has less of a need for fast response times. The present invention, as depicted in FIG. 1, employs a high-speed, low precision error estimator scheme with a low-speed and high precession error estimator scheme to isolate both low-level and high-level inertial sensor failures.

Referring more particularly to FIG. 1, high-speed error estimator 160a is intended to isolate high-level inertial sensor failures by estimating the spatial relationship between the two inertial sensor arrays, namely those observed measurements by inertial sensor arrays 110a and 110b of the individual inertial reference units 100a and 100b. Once the spatial relationship between the two inertial sensor arrays is established, the "external" reference inertial sensor output data may be used to isolate the local inertial sensor failures of the local inertial sensor array. More specifically as illustrated, a high-speed error estimator 160a may isolate those inertial sensors of local inertial sensor array 110a by utilizing the array of inertial sensor outputs from the external inertial sensor array 110b. Of course, the opposite is employed with respect to inertial reference unit 100b.

In accordance with the present invention, low-level failures are isolated by utilizing position and velocity information obtained from a satellite positioning system, commonly referred to as a "GPS" system or the like. This information is used as the local measurement standard to estimate local inertial sensor errors so as to be able to isolate local inertial sensor failures. As depicted in FIG. 1, GPS position estimator 180a provides velocity and position information to the low-speed error estimator 170a via output data signal line 182a. One embodiment of low-speed estimator 170a may be a low-speed Kalman filter for providing the low-speed inertial sensor error estimates as input data to fault isolation and reconfiguration means 130a via output signal line 172a.

As noted in FIG. 1, both the high-speed error estimator 160a and the low-speed error estimator 170a receive as an input the fault-free inertial sensor configuration information from fault isolation reconfiguration means 130a. This information is used by the high-speed error estimator 160a and low-speed error estimator 170a to only determine such estimates based on the current fault-free inertial sensor configuration.

Thus, in practice of the present invention, a minimum set of inertial sensors for a given level of redundancy is provided by separately isolating both high-level and low-level inertial sensor failures. Specifically, when the inertial sensor array is a skewed axis set of inertial sensors, i.e., gyros or accelerometers, the system is capable of isolating inertial sensor failures on a minimum of four inertial sensors to result in a minimum operational set of these inertial sensors. This is so since the high-speed error estimator makes use of the inertial sensor output data of the external inertial sensor array of the redundant inertial reference unit as a reference basis to judge the measurements of the local inertial sensor array.

Further, due to potential possible errors in the spatial estimate between the two inertial sensor arrays, the high-speed error estimator is not capable of reliably isolating low-level failures of the local inertial sensor array. Therefore, in accordance with the present invention, the low-speed error estimator 170a processes the local inertial sensor output information with low-speed but precise position and velocity information provided by the GPS position estimator 180a realizing that the low-speed error estimator cannot isolate high-level faults quickly due to the noise in the GPS position and velocity measurements.

However, when the high-speed estimator and the low-speed estimator are combined in accordance with the present invention, fault isolation and detection is maximized to the minimum number of inertial sensors required-four in the six gyro/six accelerometer skewed axis inertial sensor configuration, and the combination is such that both the high-level faults and low-level faults are detected and isolated with improved precision and quickness.

It should be recognized by those skilled in the art that the block diagram of the accompanying figure may be configured by employment of many electronic subsystems, computers, software/firmware and the like. The interconnections and arrangements are only exemplary of one embodiment of the invention, and therefore may take other forms within the true spirit and scope of the present invention as defined in accompanying claims.

More specifically, the number of inertial sensors and arrangement thereof, as well as the choice for a high-level and low level error estimators are all within the true spirit and scope of the present invention.

The embodiments of an invention in which an exclusive property or right is claimed are defined as follows:

1. A fault tolerant inertial reference system comprising:
   a first inertial reference unit including,
      a first array of at least four inertial sensors mounted along skewed axes to a support frame for providing a first array of inertial sensor outputs,
      a first satellite positioning system position estimator for obtaining first positional information related to said support frame,
      means for determining first low-speed inertial sensor error estimates as a function of said first array of inertial sensor outputs, said first positional information, and first fault-free inertial sensor configuration information, means for determining first high-speed inertial sensor error estimates as a function of said first array of inertial sensor outputs, a second array of inertial sensor outputs from a second array of at least four inertial sensors mounted along skewed axes to said support frame, independent of said first array of inertial sensors, and said first fault-free inertial sensor configuration information, first fault isolation and reconfiguration means, responsive to said first low-speed error estimates and said first high-speed error estimates, for determining said first fault-free inertial sensor configuration information indicative of any faulty inertial sensors of said first inertial sensor array, and first inertial reference processor responsive to said first fault-free inertial sensor configuration and said first array of inertial sensor outputs for providing first fault tolerant inertial reference information derived from those ones of said first array of inertial sensor being fault-free; and a second inertial reference unit including, said second array of inertial sensors for providing said second array of inertial sensor outputs, a second satellite positioning system position estimator for obtaining second positional information related to said support frame, means for determining second low-speed inertial sensor error estimates as a function of said second array of inertial sensor outputs, said second positional information obtained from said second satellite positioning system position estimator, and second fault-free inertial sensor configuration information, means for determining second high-speed inertial sensor error estimates as a function of said first array of inertial sensor outputs, said second array of inertial sensor outputs, and said second fault-free inertial sensor configuration information, second fault isolation and reconfiguration means, responsive to said second low-speed error estimates and said second high-speed error estimates, for determining said second fault-free inertial sensor configuration information indicative of any faulty inertial sensors of said second inertial sensor array, and second inertial reference processor responsive to said second fault-free inertial sensor configuration and said second array of inertial sensor outputs for providing second fault tolerant inertial reference information derived from those ones of said second array of inertial sensors being fault-free.

2. The fault tolerant inertial reference system of claim 1 wherein:

said first inertial reference unit includes a fault detection means responsive to said first array of inertial sensor outputs for providing a first fault signal indicative of the existence of a faulty one of said first array of inertial sensors, and where in said first fault isolation and reconfiguration means is responsive thereto, and, said second inertial reference unit includes a fault detection means responsive to said second array of inertial sensor outputs for providing a second fault signal indicative of the existence of a faulty one of said second array of inertial sensors, and wherein said second fault isolation and reconfiguration means is responsive thereto.

3. The fault tolerant inertial reference system of claim 1 wherein said first and second positional information includes position and velocity information related to said support frame.

4. The fault tolerant inertial reference system of claim 1 wherein said first and second fault isolation and reconfiguration means is operative for comparing said first and second low-speed and said first and second high-speed inertial sensor error estimates, respectively, to selected maximum values.

5. The fault tolerant inertial reference system of claim 1 wherein said means for obtaining said first low-speed inertial sensor error estimates includes a Kalman filter for operating on said first array of inertial sensor outputs and said first positional information for deriving said low-speed inertial sensor error estimates, and said means for obtaining said second low-speed inertial sensor error estimates includes a Kalman filter for operating on said second array of inertial sensor outputs and said second positional information for deriving said low-speed inertial error estimates.

6. The fault tolerant inertial reference system of claim 5 wherein said Kalman filter is a narrow bandwidth Kalman filter.

7. The fault tolerant inertial reference system of claim 1 wherein said means for obtaining said first high-speed inertial sensor error estimates includes a Kalman filter for operating on said first and second array of inertial sensor outputs for deriving said high-speed inertial sensor error estimates, and said means for obtaining said second high-speed inertial sensor error estimates includes a Kalman filter for operating on said first and second array of inertial sensor outputs for deriving said high-speed inertial sensor error estimates.

8. The fault tolerant inertial reference system of claim 5 wherein said Kalman filter is a wide bandwidth Kalman filter.

9. The fault tolerant inertial reference system of claim 1 where each of said means for determing said first and second high-speed inertial sensor error estimates includes means for determing the spatial relationship between said first and second arrays of inertial sensors as function of said first and second array of inertial sensor outputs, and wherein each of said first and second high-speed error estimates is a function of said spatial relationship.

10. The fault tolerant inertial reference system of claim 1 wherein said first low speed inertial sensor error estimates is a function of the differences between said first positional information and like-kind positional information derived from said first array of inertial sensor outputs, and said second low speed inertial sensor error estimates is a function of the differences between said second positional information and like-kind positional information derived from said second array of inertial sensor outputs.

\* \* \* \* \*